Patented Aug. 12, 1930

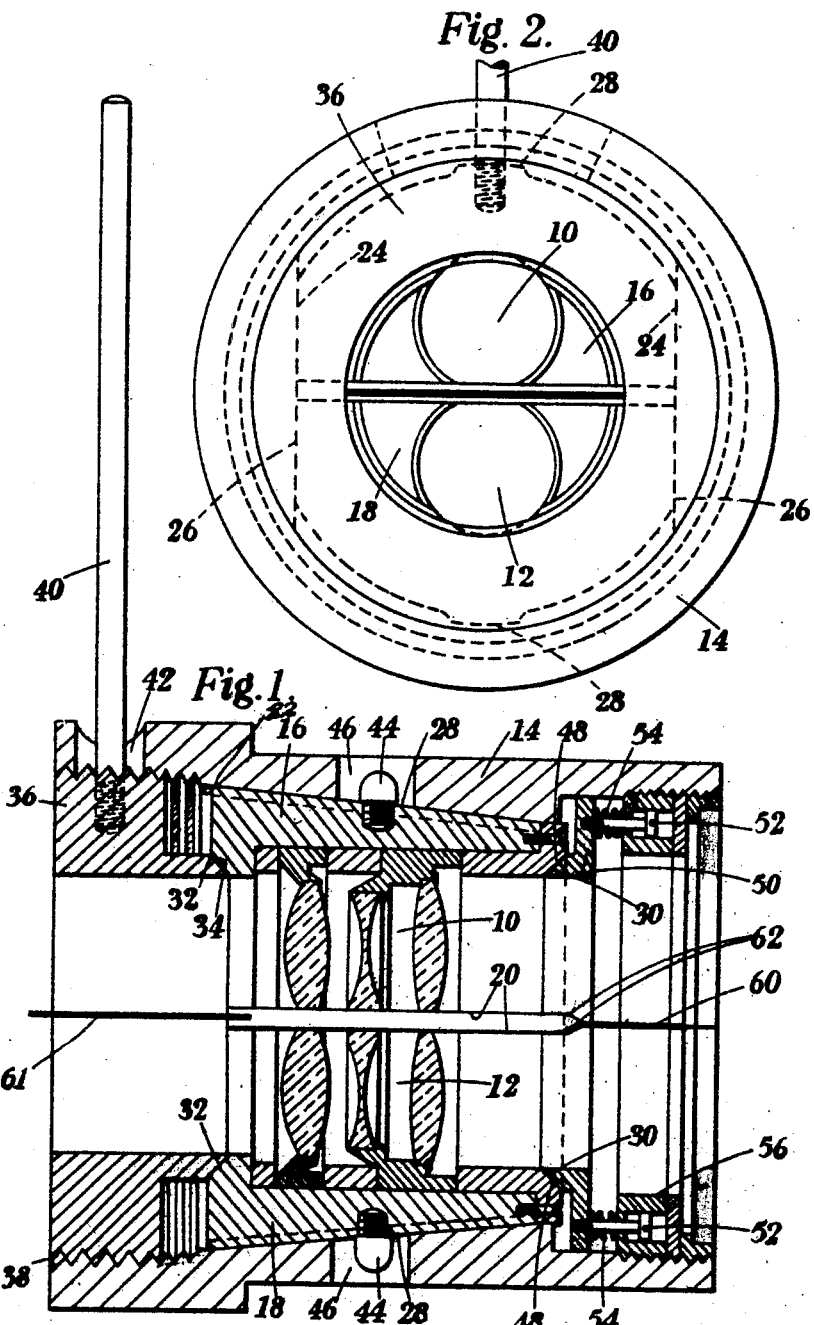

1,773,021

UNITED STATES PATENT OFFICE

REGINALD STRATTEN ALLDRIDGE, OF HARROW, ENGLAND, ASSIGNOR TO RAYCOL LIMITED, OF LONDON, ENGLAND, A BRITISH COMPANY

LENS MOUNT

Application filed October 9, 1929, Serial No. 398,541, and in Great Britain July 16, 1928.

This invention relates to that class of cinematography in which two or more images are formed on different parts of a normal picture-area, such image being taken simultaneously each by a separate lens, and is not concerned with those systems of cinematography in which the several simultaneously-taken images each occupies the whole of one normal picture-area.

Difficulties arise in cinematography of the class defined above in that the several lenses have their axes displaced from one another, although by a slight amount only. It will readily be seen that the distance or distances between images on the film of a single point will be a minimum when that point is at infinity and will increase as the distance between the point and the lenses decreases. When the images are made in light of different colours for colour cinematography the result of this is that the positive images do not always come into register on the screen and it has hitherto been necessary for the operator of the projector to correct the resulting "fringing" as far as possible by manipulating prisms or like registering devices during the projection of the film.

The present invention aims at minimizing the aforesaid lack of register during the taking of the pictures, thereby rendering manipulation during projection unnecessary, by arranging that the separation of the axes of the lenses is automatically varied in accordance with the focussing adjustment of the lenses, such variation of separation being brought about by mounting the lenses to slide axially together in a single focussing-sleeve provided with inclined guides so disposed as to constrain the lenses to approach one another in proportion as they are moved forward to bring near objects into focus.

A preferred embodiment of the invention is illustrated by way of example in the accompanying drawings as applied to two-colour cinematography, Figure 1 being a side elevation of the device in section and Figure 2 a rear end elevation thereof.

Two identical lenses 10, 12 are mounted with their axes parallel in a sleeve 14 and their mounts 16, 18 (together with their lens-components if necessary) are cut away as indicated at 20 in order that the distance between their axes shall be less than the height of a normal cinematograph picture-space— actually about half the said height. The numeral 20 further indicates two thin plates of opaque material, one for each lens, which close in the cut-away sides of the lens-mounts. The particular example chosen for illustration is adapted for the case in which two images are made one above another on a normal picture-space on the film, but the invention is obviously applicable also to the case in which the two pictures are made side-by-side on the said space, in which case the distance between the lens axes is made about half the width of the picture-space. Figure 1 may be regarded as a sectional plan of a device so adapted.

The sleeve 14 has its inner surface for the most part conical as at 22 and is formed with two flat internal surfaces 24 parallel to one another, one on either side. Each lens-mount 16, 18 is provided with flat parallel surfaces 26 at its sides which are a close sliding fit between the surfaces 24 and is further provided with a part-conical surface 28 of narrow width which is inclined to the lens axis at an angle equal to the angle of inclination of the conical surface 22, whereby when the surfaces 28 and 22 are in contact the axes of the two lenses are parallel.

The lens mounts are formed at their ends with concave bevel surfaces 30, 32. The surfaces 32 at the rear ends together constitute parts of a single conical surface when the lenses are focussed at infinity, and they are engaged by the conical surface 34 of a focussing-nut 36 provided with a six-start screw-thread screwing within a similarly-threaded bore in the sleeve 14, as indicated at 38. A focussing-lever 40 is secured to the nut and extends through a slot 42 in the sleeve. Each lens-mount is provided with a peg 44 which slides in a guide-slot 46 in the sleeve 14, these pegs and guide-slots co-operating with the surfaces 24, 26 to prevent undesired rotation of the lens mounts.

The bevel surfaces 30 at the front ends of the lens mounts are conical surfaces each concentric with the axis of the corresponding lens-mount and they are engaged by conical-surfaces 48 on an apertured plate 50, the surfaces 30, 48 fitting together when the lenses are focussed at infinity. Pegs 52 secured to the plate 50 and projecting forwardly therefrom are surrounded by coiled compression springs 54 which abut against an apertured plate 56 fixed in the sleeve 14 and against the front of the plate 50 thereby urging the latter rearwardly. The pressure of the springs is communicated through the lens-mounts to the nut 36 and as will be readily understood the reactions between the bevel surfaces 32, 34 and 30, 48 will at all times cause the surfaces 28 of the lens-mounts to be pressed outwardly against the surface 22.

Further, it will be understood that when the nut 36 is turned by means of the lever 40 to move the nut 36 forwardly, the lens-mounts will be moved forwardly against the pressure of the springs 54 and will also move inwards towards one another their axes however remaining parallel. If the nut is thereafter turned in the opposite direction the springs 54 will move the lens-mounts rearwardly, parallelism being again retained, and the surfaces 28, 22 being always maintained in contact as previously explained.

When the lens-mounts are in a forward position, that is to say when the lenses are focussed on any near object, the co-operating bevel surfaces 32, 34 and 30, 48 do not fit together throughout their area but only engage over a small area at the top and bottom, but this is immaterial particularly as the maximum movement in the axial direction is only of the order of 0.05 inch with lenses of 2 inches focal length.

A septum 60 of opaque sheet material is provided in front of the lenses on the plane between them and is joined to the plates 20 by narrow flexible strips 62 extending from the rear edge of the septum, the object being to isolate the two lenses from one another. A similar septum 61 is provided behind the lenses, extending nearly to the film, in order that the two images on the film do not overlap.

The slope of the conical surfaces 22, 28 is so chosen in relation to the focal length of the lenses and the distance between their axes that the focussed images of a point on the film remain at the same distance apart, no matter what the distance of the point from the lenses between infinity and a certain minimum distance, for example six feet. In theory, the path to be traced by the lenses in order that this condition shall hold is a curved line but the maximum deviation of this curved line from a suitably-chosen straight line is so small as to be entirely negligible. The aforesaid slope may be determined graphically in a manner which will be obvious to those skilled in the art, or by calculation, taking the positions of a point on the lens when focussed at infinity and when focussed at 6 feet (or other chosen minimum distance) and joining these positions by a straight line. As an example, if the focal length of the lenses is 50 m. m. and the separation between their axes when focussed at infinity is 0.35 inch, this separation when focussed at 6 feet (and when focussed images of a point at that distance are 0.35 inch apart) will be 0.3404 inch. The slope of the surfaces 22, 28 must therefore be 4° 57', that is to say the angle of the cone 22 must be 9° 54'.

Mathematically, the relation between separation, distance of object and focal length is given by the expression $$D = S(1+m)$$

where D is the distance between images of a point in focus,
S is the separation between the axes of the lenses and
$m$ is the magnification.

If the focal length of the lenses is 50 m. m. the magnification at 6 feet (72 inches) is $$\frac{1}{35.576}.$$

If D is to be 0.35 inch, $$S = \frac{D}{1+m} = \frac{0.35}{1 + \dfrac{1}{35.576}} = 0.34043 \text{ inch.}$$

The invention provides a means of eliminating parallactic displacement from the images of all objects on which the lenses are focussed, but it should clearly be understood that parallactic displacement exists in the images of objects not in focus. Since, however, these images are blurred and lacking in definition the resulting "fringing" is not noticeable or is unobtrusive. Moreover the operator naturally focusses upon objects on which the spectator will concentrate his attention when the picture is screened and this will in itself tend to cause the inevitable fringing in the out-of-focus parts of the image to escape notice.

When the projector, with which the films made with the device above described are screened, is used always at the same distance from the screen, the separation between the projecting lenses remains fixed throughout. The invention possesses a marked advantage when used for home cinematographic projection (in the practice of which varying screen-distances are employed) in that if the same twin lens as described above is used both for taking and projecting the variation of the separation according to the focussing will automatically eliminate relative displacement between the images on the screen, whatever the screen distance.

The invention is by no means limited in its scope to the particular details of construction above described, nor is it limited to a two-lens objective as it is clear that three or more lenses can equally well be employed. The invention moreover is applicable to stereoscopic cinematography of the "anaglyph" kind, as will be readily apparent, although its advantages are specially valuable in colour-cinematography.

It will also be appreciated that the invention, while particularly applicable to cinematic photography and projection is not necessarily limited thereto and may be applied to the taking and projecting of still pictures.

I claim:

1. A compound objective comprising in combination a plurality of lenses having spaced parallel axes, mounts for said lenses, a supporting sleeve surrounding said lens mounts, guides within said sleeve converging towards one another in the forward direction and operatively associated with said mounts, a focussing-nut screwing within the supporting sleeve and engaging the ends of said mounts, and resilient means urging the lenses towards the focussing-nut.

2. A compound objective comprising in combination a plurality of lenses having spaced parallel axes, mounts for said lenses having guide-surfaces on those sides thereof remote from one another, which guide-surfaces are inclined to the axes of the lenses, a supporting sleeve surrounding said lens mounts and having internal guide-surfaces inclined with respect to the lens axes and fitting the guide surfaces on the lens-mounts, a focussing-nut screwing within the supporting sleeve, said nut having surfaces inclined with respect to the lens axes engaging corresponding surfaces on the lens mounts and adapted to urge said lens-mounts radially outwards by pressure exerted between said surfaces in the axial direction, and a member resiliently pressed against the lens mounts remote from the focussing-nut said member having surfaces inclined with respect to the lens axes engaging corresponding surfaces on the lens mounts and adapted to urge said lens-mounts radially outwards by pressure exerted between said surfaces in the axial direction.

3. A compound objective comprising in combination a plurality of lenses having spaced parallel axes, mounts for said lenses, a sleeve surrounding said lens mounts and supporting the latter for axial movement, said sleeve having an internal surface inclined with respect to the lens axes, one of said lens mounts having a portion engaging said inclined internal surface, cam means movable axially of said lenses and engaging said last named lens mount for retaining the latter in engagement with said inclined internal surface, means for resiliently urging said cam means axially of said lenses, and means for moving said lens mounts lengthwise in the supporting sleeve along said inclined surface.

4. A compound objective comprising in combination a plurality of lenses having spaced parallel axes, mounts for said lenses, a sleeve surrounding said lens mounts and supporting the latter for axial movement, said sleeve having internal surfaces inclined with respect to the lens axes, said lens mounts having portions engaging said inclined internal surfaces, means for moving said lens mounts lengthwise in the supporting sleeve along said inclined surfaces, resilient means opposed to said first named means and exerting axial thrust, and means interposed between said resilient means and said lens mounts for converting said axial thrust into axial and radial components acting on said lens mounts to retain said mounts in engagement with said first named means and with said inclined surfaces.

In witness whereof I hereunto subscribe my name this 1st day of October, 1929.

R. S. ALLDRIDGE.